United States Patent [19]

Drazy

[11] 4,269,553
[45] May 26, 1981

[54] ARBOR ASSEMBLY

[75] Inventor: James W. Drazy, Joliet, Ill.

[73] Assignee: Caterpillar Tractor Co., Peoria, Ill.

[21] Appl. No.: 138,021

[22] Filed: Feb. 11, 1980

[51] Int. Cl.³ .............................................. B23C 5/26
[52] U.S. Cl. .................................. 409/232; 279/1 A;
279/83; 279/85; 409/234
[58] Field of Search ............... 409/232, 234, 230, 231;
408/239; 279/1 A, 8, 83, 85, 1 TS; 51/166 R

[56] References Cited

U.S. PATENT DOCUMENTS

| 442,828 | 12/1890 | Russell | 408/239 |
|---|---|---|---|
| 2,783,527 | 3/1957 | Davidson | 409/232 X |
| 2,967,462 | 1/1961 | Yogus | 409/232 |

FOREIGN PATENT DOCUMENTS

| 1198275 | 12/1959 | France | 51/166 R |
|---|---|---|---|
| 786456 | 11/1957 | United Kingdom | 279/1 A |

Primary Examiner—Z. R. Bilinsky
Attorney, Agent, or Firm—Robert A. McFall

[57] ABSTRACT

PCT No. PCT/US80/00137 Sec. 371 Date Feb. 11, 1980 Sec. 102(e) Date Feb. 11, 1980 PCT Filed Feb. 11, 1980

This invention relates to an arbor assembly (10) for attaching a cutting tool (14) to a machine spindle (12). Replacing large cutting tools on multiple spindle milling machines has, heretofore, been a costly, frustrating and time-consuming job that is often aggravated by the inaccessable placement of the tool-holding spindles on a machine.

The above problems are effectively solved by providing an arbor assembly (10) having a spindle adapter (16) attachable to a machine spindle (12) and a mating cutting tool adapter (18) that is attachable to a cutting tool (14). The cutting tool adapter (18) is laterally separable from the spindle adapter (16) and is of particular use with vertically oriented spindles on multiple spindle milling machines.

2 Claims, 3 Drawing Figures

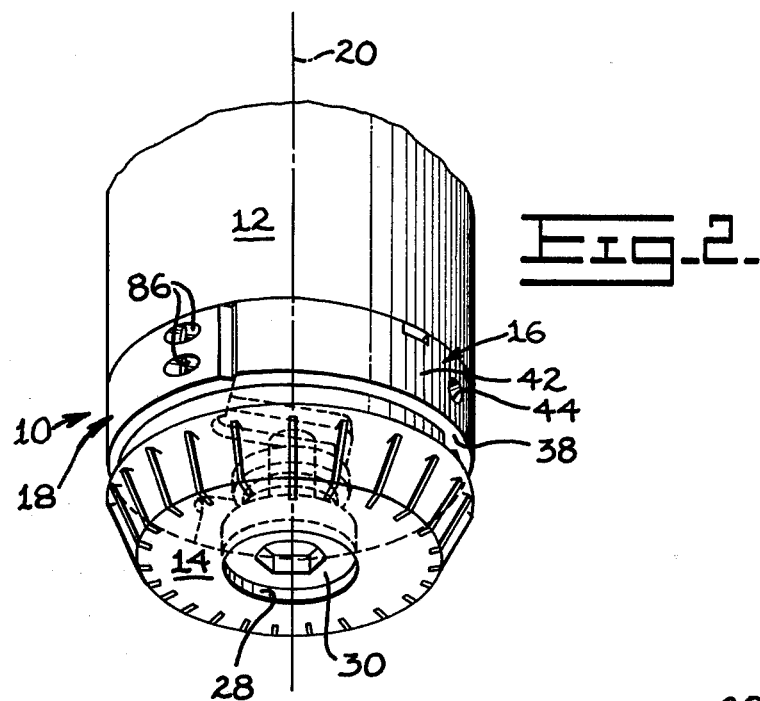
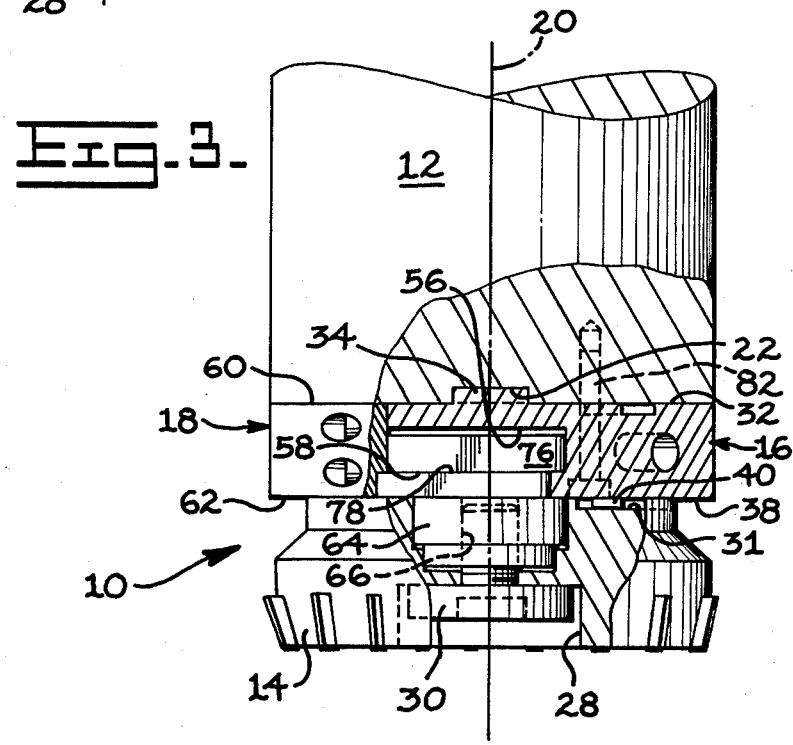

ARBOR ASSEMBLY

DESCRIPTION

1. Technical Field

This invention relates generally to an arbor assembly and more particularly to a side loading mill arbor assembly.

2. Background Art

Changing large diameter cutters on multiple spindle milling machines has long been a serious problem. In general, a single one-piece arbor is first mounted to a spindle of the machine, and then the cutter is attached to the arbor, either with a plurality of bolts arranged in a circle, or with a centrally positioned arbor screw. In either case, the cutter must somehow be held in alignment with the arbor while simultaneously threading one, or more, screws or bolts into the arbor. This is difficult to do on vertically-oriented spindles and particularly within the limited access generally provided on multiple spindle machines. The cutters, which may weigh on the order of 9-14 Kg (20-30 pounds), cannot be jacked into place, or held in place by temporary blocking since the physical presence of such shoring results in further restriction of the already limited space available for performing such tasks.

By way of example to illustrate the serious safety, accessibility and time problems, one milling machine has two horizontal spindles and two vertical spindles, each having a cutting tool attached thereto. It has heretofore been necessary for the machine operator to crawl into the machine work zone, and lay on his back, on the machine bed, to change cutters on the vertical spindles. In this particular example, the cutters had a diameter of approximately 180 mm (7 inches) and weighed about 11 Kg (25 pounds) and required one 8-hour shift for the operator to remove one cutter, and then align and install a replacement cutter. Needless to say, operators of such machines have avoided this frustrating and difficult task, with the result that cutters were not changed as often as they should have been for optimal operation.

The present invention is directed to overcoming one or more of the problems as set forth above.

DISCLOSURE OF THE INVENTION

In one aspect of the invention an arbor assembly for mounting a cutting tool on a spindle includes a cutting tool adapter for holding the cutting tool, the cutting tool adapter being laterally separable from the spindle.

Heretofore, there has not been an arbor suitable for attaching a mill cutter to a machine spindle where access to the spindle is limited or restricted by other machine elements. The present invention provides a two-piece arbor assembly by which mill cutters may now be safely and easily installed on a machine spindle by simply sliding one part of the assembly into the other. With all elements properly aligned, the bolts necessary for securing the assembly and cutter in such alignment may be easily installed and tightened. It is expected that by the present invention, a task that previously required 8 hours of difficult and frustrating work will now be accomplished in only a half-hour. Further, as outlined above, the problems of safety and accessibility are solved by the present invention.

BRIEF DESCRIPTION OF THE DRAWINGS

FIG. 2 is a diagrammatic, three-dimensional view of the arbor assembly of the present invention with the cutting tool and cutting tool adapter assembly onto the spindle and spindle adapter.

FIG. 3 is a diagrammatic, and slightly enlarged side elevational view of the arbor assembly of the present invention with portions of the spindle, arbor assembly and cutting tool broken away to show mounting details.

BEST MODE FOR CARRYING OUT THE INVENTION

Figure 1:
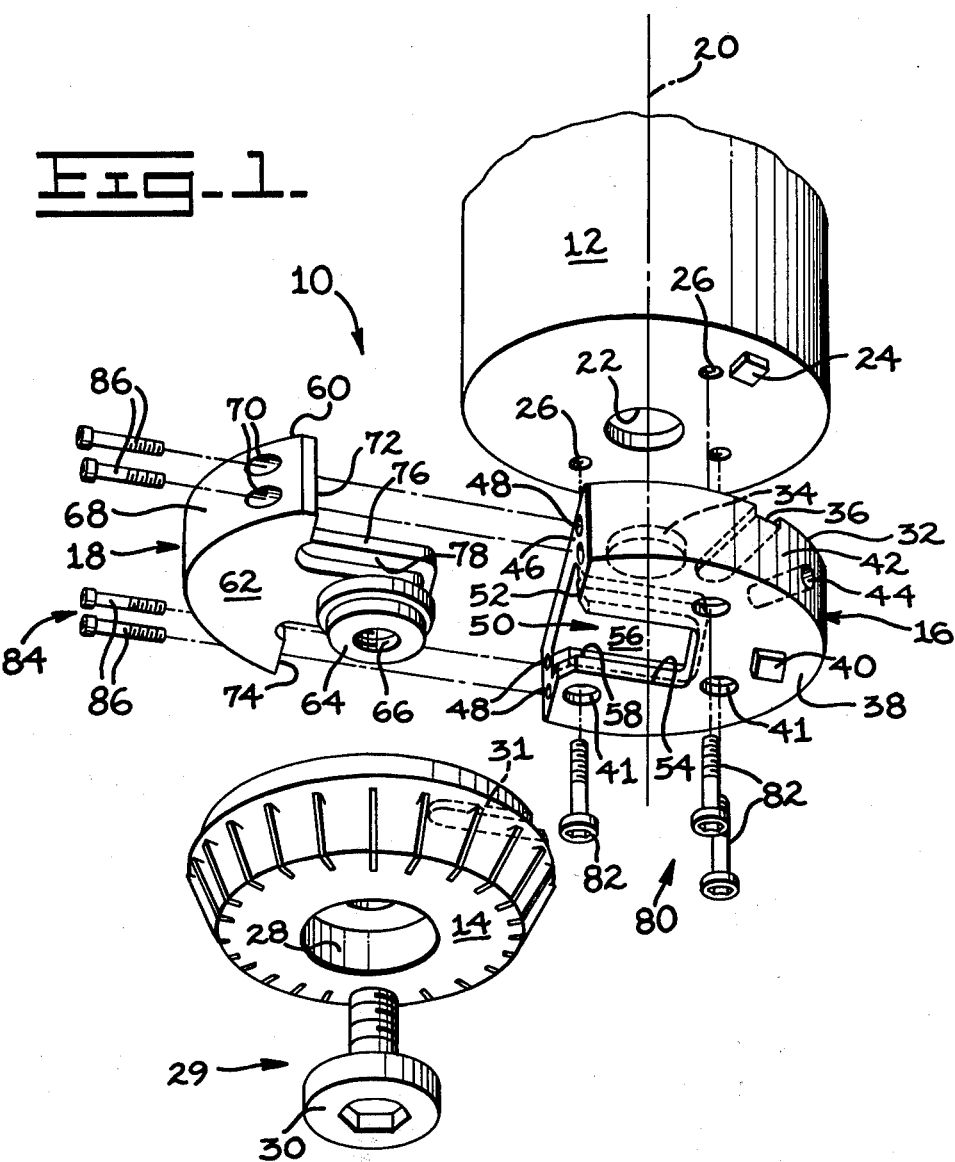
FIG. 1 is a diagrammatic, expanded, three-dimensional view of the arbor assembly of the present invention with the cutting tool and cutting tool adapter laterally spaced from the spindle and spindle adapter.

In the preferred embodiment of the invention shown in the drawings, an arbor assembly 10 is disclosed in conjunction with a vertically oriented machine spindle 12 and a cutting tool 14. The arbor assembly 10 includes a spindle adapter 16 and a side loading or laterally separable cutting tool adapter 18.

The spindle 12 has an upper end, not shown, operatively connected to a drive motor for rotation about a central axis 20. As shown in FIG. 1, a lower end of the spindle includes a bore 22 concentrically disposed with respect to the axis 20, a radially offset drive key 24, and a plurality of threaded holes 26.

The cutting tool 14, as shown in the drawings, is an indexable insert facemill cutter assembly having a centrally disposed stepped bore 28 provided therein for accommodating means 29 for mounting the cutting tool to the arbor assembly such as by a threaded arbor screw 30, and a radially oriented keyway 31 in an upper portion thereof.

The spindle adapter 16 includes an upper surface 32 having a centrally disposed cylindrical knob 34 projecting perpendicularly from the upper surface 32 and a keyway 36 extending radially outwardly parallel with the upper surface 32. The spindle adapter 16 also includes a lower surface 38 having a drive key 40 projecting from the lower surface, and a plurality of holes 41 extending between and normal to the upper and lower surfaces. A curved sidewall 42 is disposed between the upper and lower surfaces 32,38 and includes a blind bore 44 extending radially inwardly from the curved sidewall. A planar sidewall 46 is disposed between the upper and lower surfaces 32,38 and includes a plurality of threaded holes 48 extending inwardly therefrom.

The spindle adapter 16 also includes a stepped wall portion 50 defining a T-shaped first opening 52 adjacent the planar sidewall 46, a second opening 54 adjacent the lower surface 38 and a centrally disposed cavity 56 extending inwardly of the planar sidewall and the lower surface. The stepped wall portion also provides a shoulder 58 within the cavity 56, the shoulder being disposed in parallel relationship with the upper and lower surfaces 32,38.

The cutting tool adapter 18 includes an upper surface 60, a lower surface 62 parallel to the upper surface and a stepped cylindrical projection 64 extending from the lower surface for mateably engaging the stepped bore 28 of the cutting tool 14 and thereby concentrically aligning the cutting tool and the cutting tool adapter. The projection 64 has a threaded bore 66 centrally formed therein for receiving the arbor screw 30.

The cutting tool adapter also includes a curved sidewall 68 having a plurality of holes 70 extending inwardly from the curved sidewall and parallel to the upper and lower surfaces 60,62, and a pair of planar sidewalls 72,74 disposed between the upper and lower surfaces. A stepped wall portion 76, formed to mate with the cavity 56 defined by the stepped wall portion 50 of the spindle adapter 16, extends outwardly of the planar sidewalls 72,74 and includes a land 78 parallel with the upper and lower surfaces 60,62.

Means 80 for mounting the spindle adapter 16 to the spindle 12 are provided by plurality of bolts 82, having a length sufficient for extending through the holes 41 in the spindle adapter and engaging the threaded holes 26 provided in the spindle.

The arbor assembly 10 also includes means 84 for mounting the cutting tool adapter 18 to the spindle adapter 16 preferably by way of a plurality of bolts 86 having a length sufficient for extending through the holes 70 in the cutting tool adapter and engaging the threaded holes 48 in the spindle adapter.

INDUSTRIAL APPLICABILITY

In use, the spindle adapter 16 of the present invention is attached to the spindle 12 by the aforementioned bolts 82. The spindle adapter is positioned concentrically with the central axis 20 of the spindle by engagement of the knob 34 on the spindle adapter into the bore 22 of the spindle. The key 24 on the spindle is received in the keyway 36 in the spindle adapter for rotating the spindle adapter in response to rotation of the spindle. As installed, the upper and lower surfaces 32,38 of the spindle adapter and the internal shoulder 58 of the stepped wall portion 50 are each perpendicular, or normal, to the central axis 20.

After installation of the spindle adapter onto the spindle, the cutting tool 14 is partially or loosely attached to the cutting tool adapter 18 by inserting the arbor screw 30 through the stepped bore 28 of the cutting tool and threading, but not tightening, the screw into the threaded bore 66 of the cutting tool adapter. In this manner the cutting tool is free to rotate independently of the cutting tool adapter and the stepped cylindrical projection 64 of the cutting tool adapter is not "bottomed out" in the stepped bore 28 of the cutting tool.

Next, the partially assembled cutting tool-cutting tool adapter is joined with the spindle adapter 16 by laterally inserting the stepped wall portion 76 of the cutting tool adapter through the first opening 52 in the stepped wall portion 50 of the spindle adapter and then simply sliding the unit into the cavity 56 so that the land 78 is resting on shoulder 58 and the stepped cylindrical projection 64 extends outwardly of the second opening 54. During this step, it may be necessary to slightly rotate the cutting tool 14 with respect to the cutting tool adapter to align the keyway 31 with the drive key 40 on the spindle adapter.

Upon seating the cutting tool adapter 18 into the spindle adapter 16 the threaded bore 66 of the cutting tool adapter is automatically aligned with the center axis 20. Next, the bolts 86 are inserted through the laterally extending holes 70 in the cutting tool adapter and partially threaded into the threaded holes 48 in the spindle adapter. A tool, not shown, is inserted into the radially oriented bore 44 on the spindle adapter to prevent rotation of the spindle, and, while holding the spindle and spindle adapter stationary, the arbor screw is tightened, thereby drawing the land 78 into forcible contact with the shoulder 58 and drawing the cutting tool 14 up against the lower surface 38 of the spindle adapter, as shown in FIG. 3. As a final step, the bolts 86 are tightened into the threaded holes 48 thereby locking the cutting tool adapter to the spindle adapter.

Upon completion of the above described assembly operation, the cutting tool 14 is detachably mounted onto the spindle 12 in an accurately aligned relationship with the center axis 20. Also, the cutting tool will rotate in a plane normal to the center axis since the tool is drawn up and located against a surface normal to center axis, i.e., the lower surface 38 of the spindle adapter.

To change cutting tools, it is only necessary to remove the cutting tool and cutting tool adapter. This is quickly, easily and safely accomplished by removing the bolts 86 and, while holding the spindle against rotation via a rod or tool inserted into the radial bore 44, simply loosen the arbor screw a couple of turns. This action will release shoulder 58 from forcible contact with the land 78 and space the cutting tool a sufficient distance from the lower surface of the spindle to permit lateral withdrawal of the cutting tool-cutting tool adapter unit. After separation from the spindle, if desired, a new cutting tool may be assembled onto the cutting tool adapter and then laterally installed onto the machine spindle in the previously described manner without disturbing, or removing, the spindle adapter.

Other aspects, objects and advantages of this invention can be obtained from a study of the drawings, the disclosure and the appended claims.

I claim:

1. An arbor assembly (10) for mounting a cutting tool (14) to a spindle (12), comprising:
   a spindle adapter (16) having an upper surface (32), a lower surface (38), a planar sidewall (46) disposed between said upper and lower surfaces (32,38), and a stepped wall portion (50) defining a first opening (52) adjacent said planar sidewall (46), a second opening (54) adjacent said lower surface (38), and a centrally disposed cavity (56) extending inwardly of said sidewall (46) and said lower surface (38);
   a cutting tool adapter (18) having an upper surface (60), a lower surface (62), a pair of planar sidewalls (72,74) disposed between the upper and lower surfaces (60,62), and a stepped wall portion (76) extending outwardly of said pair of sidewalls (72,74) and of said lower surface (62), and being of a construction sufficient for alignably mating with the cavity (56) defined by the stepped wall portion (50) of the spindle adapter (16);
   means (80) for mounting the spindle adapter (16) to the spindle (12);
   means (84) for mounting said cutting tool adapter (18) to said spindle (16) and maintaining the planar sidewall (46) of the spindle adapter (16) in an abutting relationship with the pair of planar sidewalls (72,74) of the cutting tool adapter (18), and
   means (29) for mounting the cutting tool (14) to said arbor assembly (10).

2. The arbor assembly (10), as set forth in claim 1, wherein the cutting tool (14) includes a central bore (28), the stepped wall portion (50) of the spindle adapter (16) includes a shoulder (58), the cutting tool adapter (18) includes a centrally disposed threaded bore (66), the stepped wall portion (76) of the cutting tool adapter (18) includes a land (78), and the means (29) for mounting the cutting tool (14) includes a threaded arbor screw (30), such means for mounting the cutting tool (14) being of a construction sufficient for alignably contacting the shoulder (58) and land (78) in response to inserting said arbor screw (30) through the central bore (28) of the cutting tool (14) and threadably engaging the threaded bore (66) of the cutting tool adapter (18).

* * * * *